March 10, 1942.  G. BELL  2,276,143
BEARING
Filed July 17, 1937
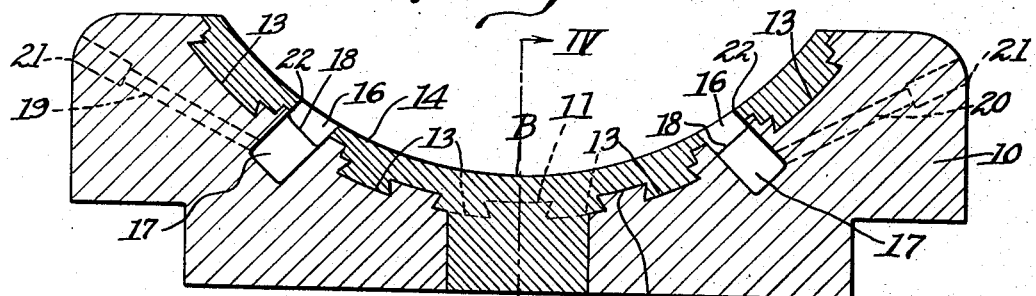
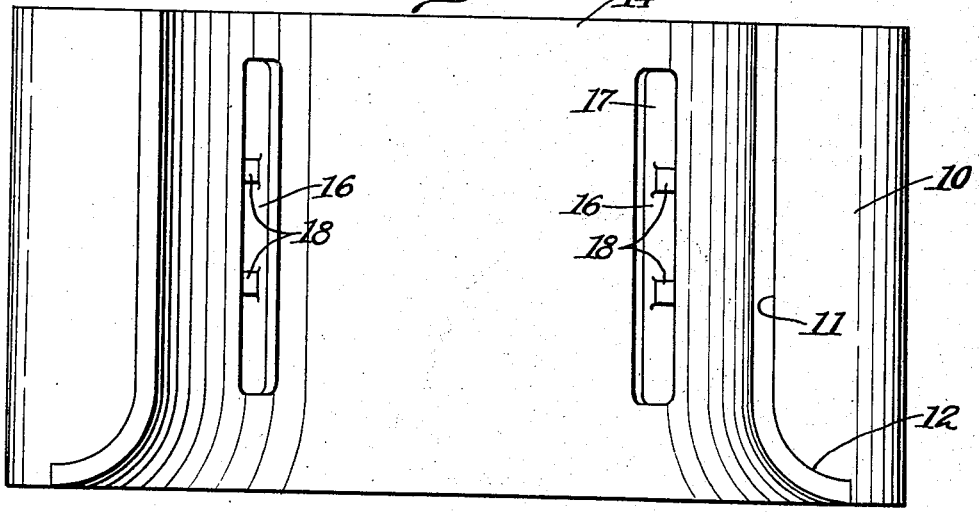
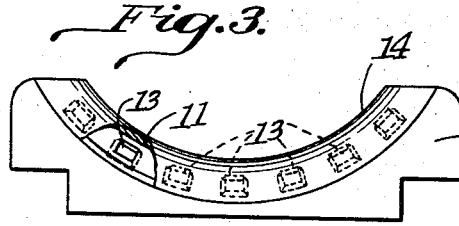
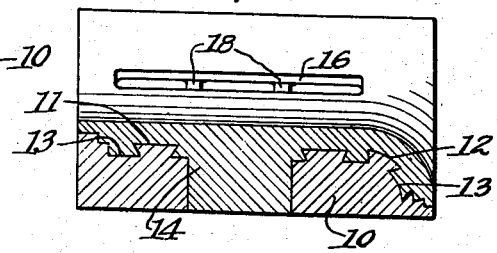
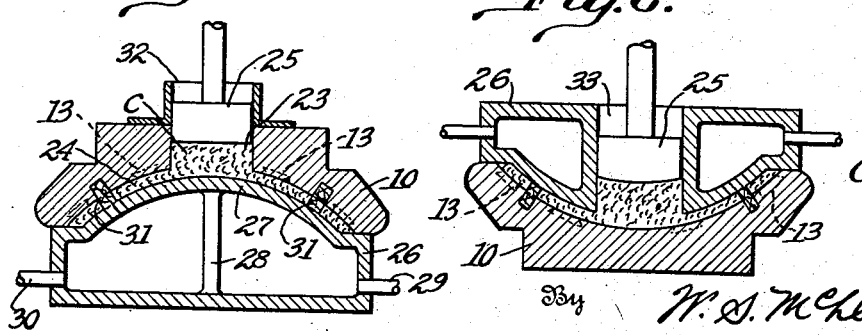
Inventor
George Bell
By W. S. McDowell
Attorney Patented Mar. 10, 1942

2,276,143

UNITED STATES PATENT OFFICE 2,276,143

BEARING

George Bell, Wallasey, England, assignor, by mesne assignments, to The Ironsides Company, Columbus, Ohio, a corporation of Ohio Application July 17, 1937, Serial No. 154,286
In Great Britain December 31, 1935

2 Claims. (Cl. 18—59)

This invention is for improvements in or relating to bearings, and is particularly concerned with bearing blocks and the manufacture of such bearing blocks. The bearing blocks according to the invention are advantageously used in bearings for heavy machinery such as rolling mills and the like.

In rolling mill and like bearings bushes have been employed composed of a synthetic resin material, now manufactured under various trade names and used in the plastic moulding art, and these bushes have been shaped to fit the bearing blocks, the moulded bush in its hard finished form being secured in the bearing block by clamping means. It has been found that such bushes are not satisfactory in use owing to the tendency for relative movement between the bush and the block to develop, and furthermore the lubrication and cooling of the bearing surface of the bush presented difficulties.

I have found, however, that to obtain the best results the substance should be used as a lining connected to the bearing blocks after the manner employed in connection with white metal bearings; it is not possible, however, to apply the synthetic resin to the bearing in the manner in which white metal is applied, that is by running the metal into the bearings in the mouldable state whilst the shaft is in position therein, and the present invention has for its object the provision of a bearing in which the synthetic resinous substance forms a lining as distinguished from a bush, and in which the mode of lubrication and/or cooling is modified to suit the bearing construction and the material employed for lining, and whereby, in particular, bearings of this type for shafts of large diameter and considerable bearing pressure may be employed with satisfactory results at comparatively low speeds.

According to the present invention there is provided in or for use in a bearing, a bearing block having a synthetic resin lining forming the bearing surface and moulded in position on the block, and engaging keying means on the block to prevent longitudinal and transverse movement of the lining with respect to the block. The synthetic resin material when plastic is caused to flow into engagement with keying means provided on the block so that the lining when hard is keyed against movement in a longitudinal and transverse direction relatively to the block. Preferably the keying means consists of dove-tailed recesses or projections formed in the block and the plastic resinous material is pressed into and around the said recesses or projections so that when the lining is hard it is keyed to the block.

In carrying out the invention the upper and lower bearing blocks, when fitted with a lining in a manner to be described, preferably respectively subtend an angle substantially less than 180 degrees, 120 to 130 degrees being found convenient, so that there is a free space on each side of the shaft.

The bearing blocks, the external configuration of which would be varied in accordance with the design of the machine frame and the bearing caps, have bores, the surfaces of which are of cylindrical configuration with the usual curvilinear fillets, and there are uniformly distributed over the cylindrical surface and the curvilinear surface a series of dovetail projections or recesses adapted to engage and retain in position the linings of synthetic resinous substances.

According to one modification the lining is formed as follows: A synthetic resin in sheet form having an openly woven linen or the like fabric foundation is broken up into small pieces which are introduced into a steam-heated mould and the bearing block (with its dovetailed recesses) forms one wall of the mould. A suitable temperature for the steam is about 200 degrees Fahrenheit, and the resinous material is subjected to the moulding pressure of a hydraulic ram, the surface of the mould and ram end being such that the said pieces, promiscuously mixed together are, when softened by the heat, pressed to shape so as to provide a segment of cylindrical configuration in engagement with the block, the length in an axial direction and the exterior radius of curvature of which correspond with the length and interior radius of curvature of the cylindrical portion of the bearing block, the thickness being approximately equal to the radius dimension of the proposed lining. The synthetic resin material used in carrying out this invention is commercially available under various trade names and in various forms, and the characteristics of the various synthetic resins, such as hardness and tensile strength, are well known to those skilled in the art of plastic mouldings. The resinous material per se forms no part of this invention, and may be used in powder form or by breaking up a sheet of synthetic resin having a fabric foundation, or it may be possible under certain conditions to preform a slab of resinous material to a shape approximating to that of the lining, and then render that slab plastic in contact with the bearing block, and press the plastic slab into engagement with the keying means on the bearing block.

The bearing block to which the lining has to be fitted is introduced into the press employed to carry out the operation described, or into a press designed for the purpose; the press, in either case, being so shaped that the bearing block is rigidly supported in the press with its medial radial centre line coinciding with that of the ram of the press; and the ram is fitted with a semi-cylindrical head or end piece, the configuration of which may correspond with that of the shaft for which the bearing is intended. The mould is heated, the resinous substance softened, and sufficient pressure provided to ensure that the substance shall flow over and surround the dovetail projections or fill the dovetail recesses, and that the interior of the lining so formed will have a smooth semi-cylindrical surface corresponding with that of the shaft which it carries, after which the bearing block is removed and fitted in place in the bearing.

I find that a continuous lining subtending an angle of 120 to 130 degrees whilst suitable for a shaft having normal bearing speeds does not give satisfactory results with shafts of large diameter running at comparatively low speeds; the reason being that the lubricant, usually water or an emulsion introduced at the free spaces at the sides of the shaft is not carried, by the slowly rotating shaft, over the whole surface of the bearing lining or at least over the main axis of pressure on the lining; I therefore provide the said lining with two laterally located axially disposed ports preferably of rectangular configuration, the axial lengths of which are somewhat less than the axial length of the cylindrical part of the lining; and I provide in the bearing blocks passage-ways which align with the said ports, and I lead the lubricant to the said passage-ways. The angle subtended by the inner edges of the ports is substantially less than the angle subtended by the lining. This angle is predetermined in accordance with the normal speed of the shaft which the block is adapted to support, and is increased or decreased directly in accordance with the said shaft speed; the reason for the adjustment of the angle as aforesaid is that with shafts which rotate at slow speed the port directing the lubricant between the shaft and the lining is close to the main axis of bearing-pressure on the lining, and therefore this slowly rotating shaft is enabled to carry a film of lubricant over such axis, and thereby give efficient lubrication. With certain classes of lining it may be more important to maintain a cooling medium between the shaft and the lining, and therefore similar considerations to those set out above with regard to lubricants apply to the feeding of cooling medium to the bearing. In some cases the lubricant employed is also a cooling medium. Similarly with the object of maintaining a film of lubricating and/or cooling medium over the main axis of pressure on the lining I connect a source of lubricant or cooling medium to the ports described, and vary the pressure at which the said medium is supplied in accordance with the speed of the shaft supported in the bearing. Where I provide two ports for lubricating and/or cooling medium I locate these on each side of the longitudinal axis of the bearing block and parallel to the said axis, and I cause lubrication or cooling to be effected through one or other of these ports depending on the direction of rotation of the shaft.

The ports may be cut in the lining after it has been fixed in position, or the semi-cylindrical die or head of the ram may be shaped so as to mould the said ports whilst the lining is being pressed into position in the bearing block, or removable inserts may be located in the space in which the lining is moulded opposite the inlet and outlet passage-ways or ducts in the bearing block, so that the ports are formed when the removable inserts are eliminated after the lining is moulded.

One example of a bearing block and its manufacture in accordance with the present invention will now be described with reference to the accompanying drawing, whereon—

Figure 1 is a sectional elevation through the bearing block with the lining moulded thereon, Figure 2 is a plan view of the block shown on Figure 1, Figure 3 is an end elevation of the bearing block, Figure 4 is a section on the line IV—IV of Figure 1 looking in the direction of the arrow, Figure 5 is a diagrammatic view showing one method of moulding the lining on to the bearing block, and Figure 6 is a diagrammatic view of an alternative method of moulding the lining on to the bearing block.

With reference to Figures 1 to 4 inclusive, the bearing block 10 which may be of any metal suitable for the load which the bearing has to stand is formed with a cylindrical bore 11, and the angle subtended at the axis of the bore is of the order of 130 degrees so that when upper and lower bearing blocks are mounted to form a bearing there is a free space on each side of the shaft supported in the blocks. The bore of the block has the usual curvilinear fillet 12 and distributed over the cylindrical surface is a series of dove-tailed recesses 13 adapted to be engaged by the synthetic resin lining 14 when the latter is pressed, in a plastic condition, into the cylindrical surface of the block. Further dove-tailed recesses 13 hold the lining 14 on the fillet 12. A continuous lining subtending an angle of 130 degrees as hereinbefore described while suitable for a shaft having normal bearing speeds does give satisfactory results at low speeds. The lining 14 is therefore provided with two laterally located ports 16 located symmetrically on opposite sides of the longitudinal axis of the lining and extending parallel therewith. These ports communicate with channels 17 formed in the bearing block and having strengthening bridge-pieces 18. Inlet and outlet ducts 19, 20, communicate with the channels 17, and these ports are so disposed, for a lower bearing block, that the lowest point 21 of the end of the duct remote from the channel 17 is above the highest point 22 of the port 16. The circulation of lubricating and/or cooling medium is effected through the left hand port in Figure 1 when the rotation of the shaft is counterclockwise, and through the right hand port when the rotation of the shaft is clock-wise. The axis of bearing pressure is generally at the lowest point of the bore designated by the letter B on Figure 1, but depending on the nature of the work for which the shaft is used this main axis of pressure may be angularly spaced from the point B by a small amount, but in any case for effective lubrication and cooling the appropriate medium must be carried round the lining from whichever port 16 is functioning past the point B, and therefore the angle which the ducts 16 subtend at the axis of the bore of the lining is predetermined according to the normal speed of the shaft and for low speeds the aforesaid angle will be relatively small to ensure that the medium is carried past the point B, but for higher speeds the angle can be larger. Similarly for the purpose of maintaining a film of the appropriate medium between the shaft and the lining the ducts 19 may be connected to a source of lubricant and/or cooling medium, the delivery pressure of which is adjusted according to the shaft speed. This may be performed by maintaining a storage tank of the appropriate medium in communication with the appropriate port and varying the height of the said storage tank with respect to the bearing so that the head is greater or lesser for greater or lesser shaft speeds.

In Figure 5 is diagrammatically illustrated one method of forming the lining. A synthetic resin in sheet form having an openly woven fabric foundation is broken up into small pieces C, and these are filled through a filling aperture 23 formed in the block 10 into a space 24, the radial depth of which corresponds with the thickness of lining desired. The space 24 is obtained by clamping the bearing block 10 base-upwards in a press, the bearing block being rigidly supported with its medial radial centre line coinciding with that of the ram 25 of the press; the block thus forms one wall of the mould for the lining and the other walls are formed by a die 26 having a curved arch 27 supported by a bridge 28, the curvature of the arch corresponding with the diameter of the shaft which the bearing is adapted to support. The die 26 may be hollow and steam-heated (by steam at a temperature of about 200° F.) introduced through the inlet 29 and carried away by the outlet 30. Wooden inserts 31 are located in the space 24 corresponding to the ports which have to be formed in the lining, and the heat transmitted through the walls of the die renders the resinous material C plastic so that by exerting pressure on the ram 25 the plastic material is forced into the space 24 and flows into and surrounds the dove-tailed recesses 13 on the bearing block. To ensure a dense compact lining an excess of sub-divided resinous material C is provided at the filling-aperture 23 and as shown in Figure 1 of the drawing this excess material is generally sufficient entirely to fill the aperture 23. To ensure such filling an additional chamber 32 may be associated with the press.

In Figure 6 is shown a modification in which the ram 25 projects through a filling aperture 33 provided in the die 26, and if desired the ram may have a semi-cylindrical head, the configuration of which corresponds with that of the internal bore of the lining. In this modification the block is held in the press base-downwards.

Details of construction and the mode of moulding the lining given by way of example in the foregoing description may be modified according to the type and size of bearing to which the invention is applied. For example, while the lining has been described as moulded to a segmental shape it will be appreciated that a block of resinous material may be moulded in position on a bearing block and cored out to form the cylindrical bore.

What is claimed is:

1. The method of forming bearings which comprises utilizing a bearing block having a lining-receiving surface and an opening surrounding the medial radial center line of the block and extending therefrom to the rear of said block, positioning a hollow die in engagement with said block, said die being provided with an arcuate face disposed in spaced relation from said lining-receiving surface, providing a ram in said block opening to coincide with the medial radial center line of the block, filling the space between the ram and die with an excess of a finely divided dry synthetic resin, introducing steam into said die to soften the resin, and forcing said ram into the opening in said block to exert pressure on said softened resin to cause it to closely engage the surfaces of said block and die.

2. The method of forming bearings which comprises utilizing a bearing block having an irregular lining-receiving surface and an opening surrounding the medial radial center line of the block and extending therefrom to the opposite side of said block, positioning said block with the lining-receiving surface in close proximity to a die having a convex surface, providing a ram movable in said block opening to coincide with the medial radial center line of the block, filling the space between the surface of the ram and the convex surface of said die with an excess of dry synthetic resin particles, heating said die to soften the particles, and moving said ram into the opening in said block to force the softened resin into intimate engagement with the surfaces of said block and die.

GEORGE BELL.